April 5, 1932. C. W. ANDERSON 1,852,278

LAMP RAY REGULATOR

Filed May 3, 1930

Inventor
Charles W. Anderson
By Bates, Golrick & Teare
Attorneys

Patented Apr. 5, 1932

1,852,278

UNITED STATES PATENT OFFICE

CHARLES W. ANDERSON, OF MILAN, OHIO

LAMP RAY REGULATOR

Application filed May 3, 1930. Serial No. 449,367.

This invention relates to light regulators for motor vehicles, and is particularly adapted for application to head lights and spot lights so as to avoid glare to the driver of an approaching vehicle. It is also adapted for use in connection with an illuminated steering range, which is shown in United States Letters Patent No. 1,753,194, which were issued to me April 8th, 1930.

The principal object of the present invention is to provide a device, which may be readily attached to existing motor vehicle lights, and which will function to provide adequate forward and lateral illumination so as to define the limits of the car to the driver of an approaching vehicle, and yet will permit the use of high candle power lamps for illuminating purposes without causing any of the direct or reflecting rays to be projected into the eyes of the driver of an approaching vehicle.

A further object of my invention is to make a shield, which embodies the characteristics of simplicity of construction, and adaptability for incorporation as an integral part of the casing construction of vehicle lamps.

Figure 1:
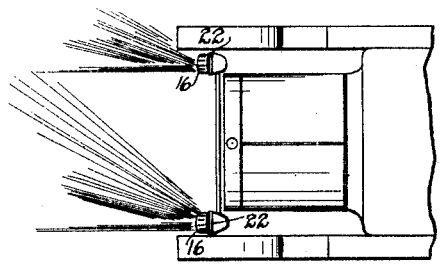
Figure 2:
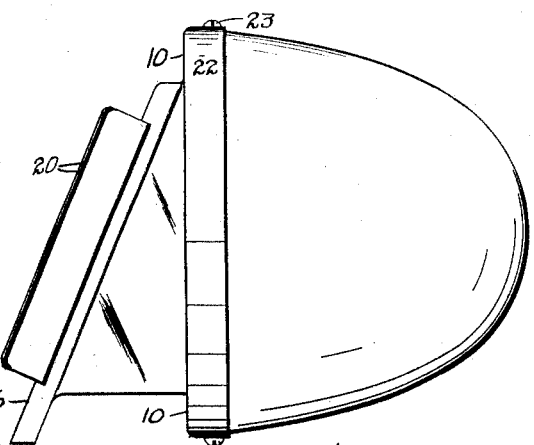
Figure 3:
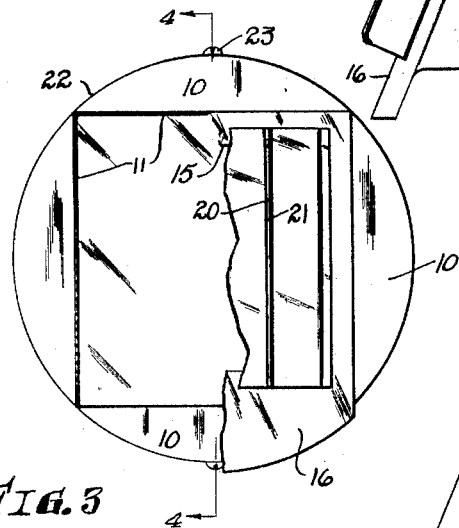
Figure 4:
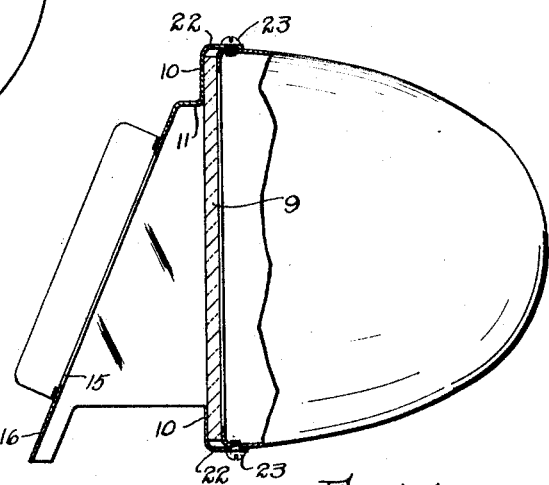
Figure 5:
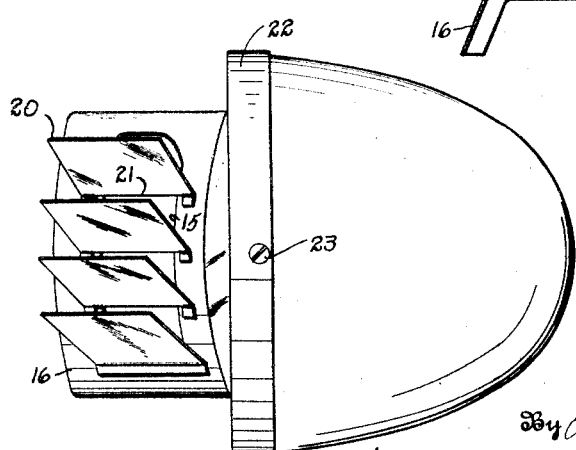

The preferred form for carrying out my invention is illustrated in the drawings, wherein Fig. 1 is a top plan view of a part of a motor vehicle having head lamps embodying my invention; Fig. 2 is a side elevation of the lamp; Fig. 3 is a front elevation of the lamp with part of the reflector broken away; Fig. 4 is a vertical section taken on the line 4—4 in Fig. 3, and Fig. 5 is a top plan view of the lamp.

I have shown my invention as embodying an attachment for the head lamp of an automobile, but if desired, it may comprise an integral part of the lamp casing. The form shown however, embodies a hood or cowl having relatively flat portions 10 which extend in front of and parallel to the lamp lens 9. Such flat portions define a substantially rectangular opening 11, the midportion of which is coextensive with the focal axis of the lamp. The cowl or hood extends forwardly of the flat portion from the top and side edges of the opening 11, and has a restricted light emitting aperture 15 on the forward wall 16 thereof. This aperture is the only opening through which light rays may extend forwardly of the lamp. The bottom of the cowl is open but the top is closed so that all light, which is emitted from the lamp must either pass through the aperture 15 or be deflected downwardly through the bottom of the cowl. The interior surface of the cowl embodies a reflecting surface so that the rays, which are emitted downwardly function in a very satisfactory manner to illuminate the front of the vehicle and to define the vehicle limits to an approaching driver.

To obtain adequate forward illumination and at the same time to avoid objectionable glare, I provide a plurality of light deflecting vanes, which extend forwardly of the cowl and obliquely thereto. These vanes extend vertically in substantially parallel arrangement and deflect light rays obliquely and forwardly of the vehicle. Where it is customary to pass approaching vehicles on the left, the vanes are arranged to deflect light to the right.

In my invention, the outer edge 20 of each vane does not overlap the inner edge 21 of an adjacent vane. This allows beams of light to be projected forwardly and to one side of the road without glare to the driver of an approaching vehicle. The outer surface of the cowl and vanes constitute non-reflecting surfaces and hence, they are finished with material which will render them opaque.

Where it is desired to make my invention an integral part of the lamp construction, the cowl and associated vanes may be made integrally with the lamp casing or with the rim, which is some cases, forms the lamp door. Where however, it is desired to use the invention as an attachment to a vehicle lamp, then I provide an annular flange 22, which is adapted to extend over and around a part of the lamp casing and utilize suitable securing members 23 for fastening the flange onto the casing.

An important advantage of my invention is the fact that it provides a positive means for avoiding glare to the driver of an approaching vehicle, and yet allows the use of high powered lamps for illuminating purposes. As considerable light rays are deflected forwardly and laterally, adequate illumination is provided for the side of the road, and yet none of the objectionable rays can be seen by the driver of an approaching vehicle. A further advantage of my invention is the fact that it can be readily atttached to existing vehicles in an expeditious manner, and that it contains no moving parts which are apt to get out of order during the operation of a vehicle.

I claim:

A head light deflector comprising an annular member adapted to fit over the open end of a lamp casing, and having segmental portions adapted to obscure portions of the lamp opening, a hollow wedge shaped hood open at the bottom and connecting the segmental portions and having a susbtantially rectangular light emitting aperture on the forward face thereof, the lower edge of the hood being disposed substantially on the line with the bottom of the casing and a plurality of substantially parallel vanes extending across the opening for deflecting light laterally, and the inclined inner face of the hood comprising a deflector for deflecting rays downwardly in an inclined direction in front of the lamp.

In testimony whereof, I hereunto affix my signature.

CHARLES WM. ANDERSON.